United States Patent
Puskas

(10) Patent No.: US 6,495,647 B2
(45) Date of Patent: Dec. 17, 2002

(54) INITIATORS FOR CARBOCATIONIC POLYMERIZATION OF OLEFINS

(75) Inventor: Judit E. Puskas, London (CA)

(73) Assignee: The University of Western Ontario, London (CA)

( * ) Notice: Subject to any disclaimer, the term of this patent is extended or adjusted under 35 U.S.C. 154(b) by 0 days.

(21) Appl. No.: 09/887,033

(22) Filed: Jun. 25, 2001

(65) Prior Publication Data

US 2001/0047066 A1 Nov. 29, 2001

Related U.S. Application Data

(62) Division of application No. 09/176,748, filed on Oct. 22, 1998, now Pat. No. 6,268,446.
(60) Provisional application No. 60/067,044, filed on Dec. 4, 1997.

(51) Int. Cl.$^7$ ................................................. C08F 16/12
(52) U.S. Cl. ........................ 526/332; 526/335; 526/347
(58) Field of Search .......................... 526/348.6, 348.7, 526/347, 210, 209, 332, 335

(56) References Cited

U.S. PATENT DOCUMENTS

| | | |
|---|---|---|
| 4,726,811 A | 2/1988 | Miller |
| 5,169,914 A | 12/1992 | Kaszas et al. |
| 5,395,885 A | 3/1995 | Kennedy et al. |
| 5,444,135 A | 8/1995 | Cheradame et al. |
| 5,448,000 A * | 9/1995 | Gullapalli et al. ............. 526/85 |
| 5,451,647 A | 9/1995 | Faust et al. |
| 5,458,796 A | 10/1995 | Storey et al. |
| 5,473,029 A | 12/1995 | Osman |
| 5,506,316 A | 4/1996 | Shaffer |
| 5,629,394 A | 5/1997 | Cheradame et al. |
| 5,663,470 A | 9/1997 | Chen et al. |
| 5,677,405 A | 10/1997 | Goodall et al. |
| 5,691,431 A | 11/1997 | Chen et al. |
| 5,844,056 A * | 12/1998 | Kennedy et al. ......... 526/348.7 |

FOREIGN PATENT DOCUMENTS

| | | |
|---|---|---|
| EP | A2-0 341 012 | 11/1989 |
| EP | A1-0 675 153 | 10/1995 |
| WO | WO 96/34023 | 10/1996 |
| WO | WO 98/05691 | 2/1998 |

OTHER PUBLICATIONS

Alger, Polymer Science Dictionary, 2nd Ed. Chapman & Hall (London) 1997, p. 558.*
Whelan, Polymer Technology Dictionary, Chapman & Hall (London) 1994, p. 433.*

Puskas J.C. et al., "New Initiators for the Living Carbocationic Polymerization of Isobutylene" Polymer Reprints, vol. 39, No. 1, 325–326 (Mar. 1998).

Puskas and Kaszas, "Polyisobutylene–Based Thermoplastic Elastomers: A Review" Rubber Chemistry and Technology, vol. 69, 462 (1996).

Puskas and Wilds, "Multiarm–Star Polyisobutylenes by Living Carbocationic Polymerization", Journal Polymer Science, Oct. 1997.

Dreyfuss and Kennedy, "Expoxidation with m–chloroperbenzoic Acid: An Analytical Method for Determining Unsaturation of Olefins and Polymers" Analytic Chemistry vol. 47(4) 771(1975).

Mark et al., "Encyclopedia of Polymer Science and Engineering", $2^{nd}$ Edition vol. 14 at p. 634.

Morrison and Boyd, "Organic Chemistry" $6^{th}$ Edition, at p. 483.

* cited by examiner

Primary Examiner—David W. Wu
Assistant Examiner—R. Harlan
(74) Attorney, Agent, or Firm—R. Craig Armstrong; Borden Ladner Gervais LLP; Kathleen E. Marsman

(57) ABSTRACT

A new class of initiators for inducing the cationic polymerization of olefins was discovered. These initiators, in conjunction with Lewis acids as coinitiators, effectively initiate the carbocationic polymerization of olefins. The new initiators are epoxides with the general formula

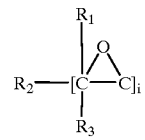

where $R_1$, $R_2$ and $R_3$ are hydrogen, alkyl, aryl or aralkyl groups, and can be the same or different, and i is a positive whole number. The Lewis acid has the general formula of $MtX_n$ where M is titanium, aluminum, boron or tin, X is a halogen, an alkyl or an alcoxy or a mixture thereof. The process is a carbocationic process, which can be living or non-living, at a temperature of from about 0 to −80 C. The polymer produced can be a homo- or copolymer (random or block) carrying hydroxy functional groups.

12 Claims, No Drawings

INITIATORS FOR CARBOCATIONIC POLYMERIZATION OF OLEFINS

REFERENCE TO RELATED APPLICATION

This is a division of application Ser. No. 09/176,748, filed Oct. 22, 1998 now U.S. Pat. No. 6,268,446, which claims benefit of Ser. No. 60/067,044, filed on Dec. 4 1997.

BACKGROUND OF THE INVENTION

The carbocationic polymerization of olefins is well-known and has been studied in detail. These processes can be initiated by systems producing carbocations. These initiating systems include Lewis and Bronsted acids, organic compounds such as halides in conjunction with Lewis acids, etc. (J. P. Kennedy: Cationic Polymerization of Olefins: A Critical Inventory. Wiley-Intersci). These processes produce high or low molecular weight polymers with various halide or olefinic functional groups, and can be further functionalized by post-polymerization reactions.

The living carbocationic polymerization of olefins such as isobutylene and styrene is a relatively new development. Prior art describes living carbocationic polymerizations producing polymers with controlled molecular weights and molecular weight distributions as low as $M_w/M_n=1.05$ (see U.S. Pat. No. 5,169,914). Suitable initiators include compounds with tertiary functional groups of the general formula shown below:

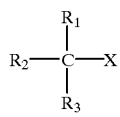

where $R_1$, $R_2$ and $R_3$ can be hydrogen or aliphatic or aromatic alkyl groups, or aralkyl groups, and X can be a halogen, hydroxyl, ether or ester groups, or peroxides. These initiators, in conjunction with Lewis acids, Electron Pair Donors and Proton Traps, have successfully been used to produce homopolymers and random or block copolymers. The prior art has recently been reviewed in detail (Rubber Chem. Techn. 69, 462 (1996). Multifunctional initiators carrying the above described tertiary functional groups have also been used to produce multiarm-star branched polymers (J. Polymer Sci., Chem. October 1997).

The above discussed living initiating systems produce halide-functionalized polymers, which can be further modified to yield other functional groups such as hydroxy- or ester. Unfortunately, these initiators are usually not available commercially and have to be synthesized by multistep synthetic routes.

SUMMARY OF THE INVENTION

The inventor has discovered that epoxides, when reacted with Lewis acids in the presence of olefins such as isobutylene and styrene, effectively initiate the carbocationic polymerization of those olefins. Epoxides are commercially available or can be synthesized by oxidizing olefins by a simple and fast process (e. g., reacting the olefin with m-Cl-perbenzoic acid in a polar solvent at room temperature, completing the reaction in a few minutes. P. Dreyfuss and J. P. Kennedy: Analytical Chem. 47(4), 771 (1975)). Epoxides are known to undergo polymerization themselves, by cationic, anionic or coordination mechanism, to yield polyethers containing oxygen in the main chain. Epoxi-ethane undergoes living anionic polymerization yielding a polyether, but substituted epoxides suffer side reactions. (Encyclopaedia of Polymer Science and Engineering, $2^{nd}$ Ed., Mark, Bikales, Overberger, Menges Eds., 14, 634, John Wiley&Sons, 1985). In the present invention, epoxides, preferably substituted epoxides, initiate the living polymerization of olefins yielding hydrocarbon polymers, instead of undergoing self-polymerization. Thus the epoxide initiating systems of the present invention produce hydrocarbon polymers with hydroxy functionality; multifunctional epoxides will produce multiple hydroxy functionalities. There is no prior art for using epoxides as initiators for the cationic polymerization of olefins.

Thus according to one aspect of the invention, there is provided a carbocationic polymerization process for producing a polyolefin polymer or copolymer carrying oxygen-containing functional group(s) (e.g., hydroxy or aldehyde) group(s), which comprises introducing a monomer charge, a Lewis acid as coinitiator and an organic epoxide compound as initiator into a suitable reaction vessel and polymerizing the monomer charge at a temperature of from about 0 degrees to about −120 degrees centigrade to form the terminally functional polymer. The monomer charge comprises the concurrent and/or sequential addition of isobutylene and a second monomer selected from the group consisting of conjugated diolefins and vinylidene aromatic compounds, and the epoxide initiator is charged in an amount of from $10^{-6}$ to about $10^{-1}$ moles per mole of the isobutylene.

According to another aspect of the invention, there is provided a living carbocationic polymerization process for producing a polyolefin polymer or copolymer carrying oxygen containing functional groups (e.g., hydroxy or aldehyde group(s)), which comprises introducing a monomer charge, a Lewis acid as coinitiator and an organic epoxide compound as initiator, a proton trap to prevent protic initiation, and an electron pair donor which may or may not be necessary to achieve living conditions, into a suitable reaction vessel and polymerizing the monomer charge at a temperature of from about 0 degrees to about −120 degrees centigrade to form the terminally functional polymer. The monomer charge comprises the concurrent and/or sequential addition of isobutylene and a second monomer selected from the group consisting of conjugated diolefins and vinylidene aromatic compounds and the epoxide initiator is charged in an amount of from $10^{-6}$ to about $10^{-1}$ moles per mole of the isobutylene.

Another view of the invention is that it provides a new class of initiators for inducing the cationic polymerization of olefins. These initiators, in conjunction with Lewis acids as coinitiators, effectively initiate the carbocationic polymerization of olefins. The new initiators are epoxides with the general formula

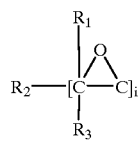

where $R_1$, $R_2$ and $R_3$ are hydrogen, alkyl, aryl or aralkyl groups, and can be the same or different, and i is a positive whole number. The Lewis acid has the general formula of $MtX_n$ where M is titanium, aluminum, boron or tin, X is a halogen, an alkyl or an alcoxy or a mixture thereof. The process is a carbocationic process, which can be living or non-living, at a temperature of from about 0 to −80 C. The polymer produced can be a homo- or copolymer (random or block) carrying hydroxy functional groups.

Further aspects of the invention and additional details and examples will be provided or will become apparent in the detailed description which follows.

DETAILED DESCRIPTION

Tertiary carbocations that are formed by the interaction of an initiator carrying a tertiary functional group, and a Lewis acid such as $BCl_3$ or $TiCl_4$, were shown to be effective initiators for the carbocationic polymerization of olefins. Such an initiator is 2,4,4-trimethylpentyl chloride in conjunction with $TiCl_4$. In her search for commercially available initiators the inventor has theorized that substituted epoxides may be effective initiators for living carbocationic polymerizations. It is taught that epoxides may undergo cleavage under acidic or basic conditions, and the cleavage is oriented in substituted epoxides: (Morrison&Boyd: Organic Chemistry, 6$^{th}$ Ed., 483 Prentice Hall, 1992)

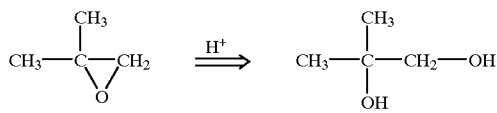

Epoxides are also known to polymerize to form polyethers. This polymerization reaction forms the base of commodity bonding compounds such as epoxy resins. The challenge was to find conditions under which tertiary carbocations forming from a substituted epoxide in conjunction with a Lewis acid would initiate the carbocationic polymerization of olefins instead of undergoing self-polymerization.

The inventor has found that compounds such as 2,4,4-trimethylpentyl-1,2-epoxide, as 2,4,4-trimethylpentyl-2,3-epoxide, alpha-methylstyrene epoxide and squalene epoxide in conjunction with a Lewis acid such as $TiCl_4$ are effective initiators for the polymerization of olefins such as isobutylene.

Without wishing to be bound by the theory, initiation is proposed to take place by the following sequence of reactions:

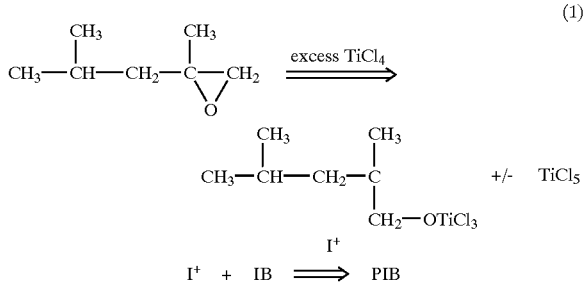

The carbocation initiates the polymerization of the olefin, or may undergo competitive self-polymerization. This latter side reaction may decrease the initiator efficiency, but the side product was found not to influence the living nature of the polymerization. Since opening the epoxi ring requires at least one $TiCl_4$ per epoxide ring, effective initiation was found to require the use of excess Lewis acid. Upon termination of the polymerization by methanol, the following reaction is proposed to take place:

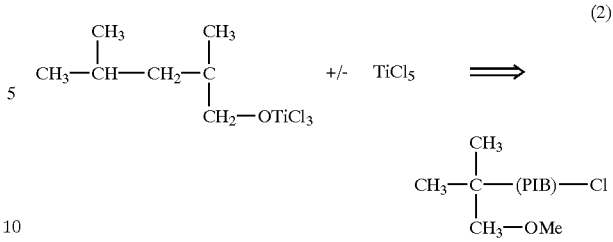

The polymer formed will then contain one hydroxy head group and one chlorine end group. By the use of di- or multifunctional initiators, polymers carrying multiple hydroxy groups can be prepared in one step.

The carbocationic polymerization of olefins is carried out at low temperature (–30 to –100 C.) in a single solvent or solvent mixture of suitable polarity. Single solvent can be n-butylchloride, while mixed solvents contain a nonpolar component such as hexane and a polar component such as methylchloride. It is also taught by the prior art that internal or external electron pair donors have beneficial effects on the polymerization such as narrowing the molecular weight distribution or preventing side reactions. Without wishing to be bound by the theory it is proposed that the epoxide-based initiating systems behave like internal electron pair donors due to the presence of the oxygen. However, the addition of external electron pair donors such as DMA may be beneficial, but will slow down the polymerization.

The epoxide initiators of the present invention can easily be synthesized from commercially available olefins, polyolefins or terpenes. For instance, 2,4,4-trimethylpentyl-1,2-epoxide was synthesized by reacting m-chloroperbenzoic acid with 2,4,4-trimethylpentene for 10 minutes at room temperature in methylene chloride solvent. Similarly, epoxidized alpha-methylstyrene and hexaepoxy squalene were synthesized by reacting alpha-methylstyrene and squalene with m-chloroperbenzoic acid for 10 minutes at room temperature in methylene chloride solvent. The products were characterized by NMR spectroscopy and were found to be fully epoxidized. The epoxides were found to be stable for a few months when stored in a refrigerator; after 4 months only one epoxide ring cleaved in the hexaepoxy squalene.

These initiators then were used to initiate the carbocationic polymerization of isobutylene.

The following examples describe the present invention. All polymerizations were carried out in a dry box under dry nitrogen, in a three-neck flask equipped with an overhead stirrer, immersed in a cooling bath at –80 C.

EXAMPLE 1

The reaction vessel was charged with 50 ml hexane and cooled to –80 C. 54.9 ml condensed methyl chloride was added, followed by the addition of 0.07 ml ($4 \times 10^{-4}$ mol) alpha-methylstyrene epoxide as an initiator, 0.16 ml 2,6-di-tert-butylpyridine (DtBP) as a proton trap to prevent protic initiation, and 16 ml isobutylene (IB) as a monomer. The polymerization was started with the addition of 0.36 ml $TiCl_4$. The monomer conversion was 70% in 120 minutes, yielding a polyisobutylene (PIB) with $M_n$=43,000 and $M_n/M_w$=1.2. The incorporation of the aromatic initiator was verified by SEC coupled with UV spectroscopy. The polymerization was living; the $M_n$ increased linearly with conversion, and $M_n/M_w$ decreased as expected. Table 1 lists the data.

TABLE 1

IB polymerization initiated with epoxidized alpha-methylstyrene

| Time | $M_n$ | $M_n/M_w$ |
|---|---|---|
| 5 | 3900 | 1.7 |
| 10 | 6100 | 1.7 |
| 15 | 8000 | 1.6 |
| 20 | 10,500 | 1.5 |
| 30 | 15,000 | 1.4 |
| 60 | 27,000 | 1.3 |
| 120 | 43000 | 1.2 |

EXAMPLE 2

The reaction vessel was charged with 50 ml hexane and cooled to −80 C. 33.4 ml condensed methyl chloride was added, followed by the addition of 0.73 ml ($5.4 \times 10^{-4}$ mol) 2,4,4-trimethylpentyl-1-epoxide as an initiator, 0.2 ml 2,6-di-tert-butylpyridine (DtBP) as a proton trap to prevent protic initiation, and 13,8 ml isobutylene (IB) as a monomer. The polymerization was started with the addition of 0.13 ml $TiCl_4$. The monomer conversion was complete in 40 minutes, yielding a polyisobutylene (PIB) with $M_n=64,000$ and $M_n/M_w=1.1$.

EXAMPLE 3

The reaction vessel was charged with 50 ml hexane and cooled to −80 C. 33.4 ml condensed methyl chloride was added, followed by the addition of 0.07 ml ($4 \times 10^{-4}$ mol) alpha-methylstyrene epoxide as an initiator, 0.2 ml 2,6-di-tert-butylpyridine (DtBP) as a proton trap to prevent protic initiation, and 16 ml isobutylene (IB) as a monomer. The polymerization was started with the addition of 0.5 ml $TiCl_4$. The monomer conversion was 80 in 30 minutes, yielding a polyisobutylene (PIB) with $M_n=66,000$ and $M_n/M_w=1.3$. The polymerization was living; $M_n$ increased linearly with conversion and $M_n/M_w$ decreased as expected. Table 2 summarizes the data:

TABLE 2

IB polymerization initiated with epoxidized alpha-methylstyrene

| Time | $M_n$ | $M_n/M_w$ |
|---|---|---|
| 2 | 15,000 | 1.6 |
| 4 | 25,000 | 1.4 |
| 6 | 35,000 | 1.3 |
| 8 | 43,000 | 1.3 |
| 10 | 49,000 | 1.3 |
| 20 | 64,000 | 1.3 |
| 30 | 66,000 | 1.3 |

EXAMPLE 4

The reaction vessel was charged with 50 ml hexane and cooled to −80 C. 34 ml condensed methyl chloride was added, followed by the addition of 0.7 ml ($4 \times 10^{-3}$ mol) alpha-methylstyrene expoxide as an initiator, 0.16 ml 2,6-di-tert-butylpyridine (DtBP) as a proton trap to prevent protic initiation, and 16 ml isobutylene (IB) as a monomer. The polymerization was started with the addition of 0.72 ml $TiCl_4$. The monomer conversion was 70% in 30 minutes, yielding a polyisobutylene (PIB) with $M_n=11,000$ and $M_n/M_w=1.2$. The incorporation of the aromatic initiator was verified by SEC coupled with UV spectroscopy. This polymer was also subjected to GC-MS analysis, which yielded oxygen-containing aromatic residues. This indicates that the headgroup of the polymer contains oxygen as shown in reaction (2).

EXAMPLE 5

The reaction vessel was charged with 153 ml methylcyclohexane and cooled to −80 C. 60 ml condensed methyl chloride was added, followed by the addition of $5 \times 10^{-4}$ mol hexaepoxy squalene as an initiator, 0.32 ml 2,6-di-tert-butylpyridine (DtBP) as a proton trap to prevent protic initiation, and 60 ml isobutylene (IB) as a monomer. The polymerization was started with the addition of $3 \times 10^{-2}$ mol $TiCl_4$. The monomer conversion was 100% in 20 minutes, yielding a polyisobutylene (PIB) with $M_n=115,000$ and $M_n/M_w=1.2$ by SEC-Multiangle Light Scattering (MLS) analysis. The slope of the radius of gyration vs molecular weight plot was found to be 0.33, indicating that the polymer has a star-branched structure (spherical shape). Assuming six arms, each arm would have $M_n=20,000$.

EXAMPLE 6

The reaction vessel was charged with 153 ml methylcyclohexane and cooled to −80 C. 60 ml condensed methyl chloride was added, followed by the addition of $4.5 \times 10^{-5}$ mol hexaepoxy squalene as an initiator, 0.32 ml 2,6-di-tert-butylpyridine (DtBP) as a proton trap to prevent protic initiation, and 43 ml isobutylene (IB) as a monomer. The polymerization was started with the addition of $2 \times 10^{-2}$ mol $TiCl_4$. The monomer conversion was 55% in 480 minutes, yielding a polyisobutylene (PIB) with $M_n=174,000$ and $M_n/M_w=1.2$ by SEC-MLS. The radius of gyration vs molecular weight plot yielded a slope of 0.32, indicating a spherical shape star-branched polymer. Assuming 6 arms, each arm would have an $M_n=30,000$.

EXAMPLE 7

The reaction vessel was charged with 153 ml methylcyclohexane and cooled to −80 C. 60 ml condensed methyl chloride was added, followed by the addition of $5 \times 10^{-4}$ mol hexaepoxy squalene as an initiator, 0.32 ml 2,6-di-tert-butylpyridine (DtBP) as a proton trap to prevent protic initiation, and 43 ml isobutylene (IB) as a monomer. The polymerization was started with the addition of $3 \times 10^{-2}$ mol $TiCl_4$. The reaction was allowed to proceed for 250 minutes, at which point 0.32 ml DtBP and 0.001 mol dimethyl acetamide DMA as an Electron Pair Donor ED were added to the mixture, followed by the addition of the prechilled mixture of 9.6 g distilled styrene and 10 g methylcyclohexane. The reaction was allowed to proceed for 20 minutes, at which point methanol was added to terminate the polymerization. NMR analysis of the product showed the presence of 10.2 mol % (17.4 wt %) styrene in the block. The isobutylene conversion was found to be 78% in 35 minutes. The polyisobutylene (PIB) had $M_n=106,700$ and $M_n/M_w=1.4$, measured just before the styrene incorporation by standard SEC with universal calibration. The final product had $M_n=125,000$ and $M_n/M_w=1.2$, measured by SEC-MLS. The radius of gyration vs molecular weight plot yielded a slope of 0.4, indicating a star-branched block copolymer with spherical shape. Assuming six arms, each arm should have a polyisobutylene section with $M_n=18,000$ and a polystyrene section with $M_n=2900$.

What is claimed:

1. A star-branched olefinic copolymer formed from polymerization of a monomer charge with an olefinic epoxide initiator, said copolymer having a core derived from said olefinic epoxide initiator, and having at least one oxygen-containing functional group attached to said core.

2. A star-branched olefinic copolymer as in claim 1, wherein said initiator is an epoxidized polyisoprene.

3. A star-branched olefinic copolymer according to claim 1, wherein said initiator is epoxidized squalene.

4. A star-branced olefinic copolymer as in claim 3, wherein said epoxidized squalene is hexaepoxy squalene.

5. A star-branched olefinic copolymer as in claim 1, wherein said oxygen containing functional group is —OH.

6. A star-branched olefinic copolymer as in claim 1, having an $M_n$ of about 100,000–200,000 g/mol, and a molecular weight distribution of about 1.2.

7. A star-branched olefinic copolymer comprising a monomer charge polymerized to a multifunctional core derived from an epoxidized olefin initiator, said core having at least one oxygen-containing functional group attached thereto.

8. A star-branched olefinic copolymer as in claim 7, wherein said initiator is an epoxidized polyisoprene.

9. A star-branched olefinic copolymer according to claim 7, wherein said initiator is epoxidized squalene.

10. A star-branched olefinic copolymer as in claim 9, wherein said epoxidized squalene is hexaepoxy squalene.

11. A star-branched olefinic copolymer as in claim 7, wherein said oxygen containing functional group is —OH.

12. A star-branched olefinic copolymer as in claim 7, with an $M_n$ of about 100,000–200,000 g/mol, and a molecular weight distribution of about 1.2.

* * * * *

UNITED STATES PATENT AND TRADEMARK OFFICE
CERTIFICATE OF CORRECTION

PATENT NO.      : 6,495,647 B2
DATED           : December 17, 2002
INVENTOR(S)     : Puskas It is certified that error appears in the above-identified patent and that said Letters Patent is hereby corrected as shown below:

Title page,
Item [57], ABSTRACT,
Line 29, please change the chemical structure shown

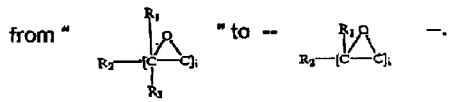

Line 30, change "where $R_1$, $R_2$ and $R_3$" to -- where $R_1$ and $R_2$ --.

Column 2,
Lines 53-59, please change the chemical structure

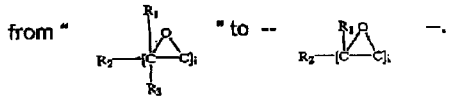

Line 61, change "where $R_1$, $R_2$ and $R_3$" to -- where $R_1$ and $R_2$ --.

Signed and Sealed this

Eighth Day of July, 2003

JAMES E. ROGAN
*Director of the United States Patent and Trademark Office*